(12) United States Patent
Yamanaka et al.

(10) Patent No.: US 10,773,715 B2
(45) Date of Patent: Sep. 15, 2020

(54) PARKING CONTROL METHOD AND PARKING CONTROL DEVICE

(71) Applicant: Nissan Motor Co., Ltd., Yokohama-shi, Kanagawa (JP)

(72) Inventors: Ryota Yamanaka, Kanagawa (JP); Yasuhiro Suzuki, Kanagawa (JP); Yasuhisa Hayakawa, Kanagawa (JP)

(73) Assignee: Nissan Motor Co., Ltd., Yokohama-shi, Kangawa (JP)

( * ) Notice: Subject to any disclaimer, the term of this patent is extended or adjusted under 35 U.S.C. 154(b) by 0 days.

(21) Appl. No.: 16/623,672

(22) PCT Filed: Jun. 23, 2017

(86) PCT No.: PCT/JP2017/023241
§ 371 (c)(1),
(2) Date: Dec. 17, 2019

(87) PCT Pub. No.: WO2018/235273
PCT Pub. Date: Dec. 27, 2018

(65) Prior Publication Data
US 2020/0189570 A1      Jun. 18, 2020

(51) Int. Cl.
*B60W 30/06* (2006.01)
*B60W 10/04* (2006.01)
*G08G 1/14* (2006.01)

(52) U.S. Cl.
CPC ............ *B60W 30/06* (2013.01); *B60W 10/04* (2013.01); *G08G 1/14* (2013.01); *B60W 2556/45* (2020.02); *B60W 2720/106* (2013.01)

(58) Field of Classification Search
CPC ............ B60W 10/04; B60W 2556/45; B60W 2720/106; B60W 30/06; B62D 15/027;
(Continued)

(56) References Cited

U.S. PATENT DOCUMENTS

2009/0175201 A1    7/2009  Guo
2012/0077477 A1*   3/2012  Oh ................... H04B 1/3822
                                              455/414.2
(Continued)

FOREIGN PATENT DOCUMENTS

CN       101146328       3/2008
JP     2016-007959 A     1/2016
(Continued)

*Primary Examiner* — Tyler J Lee
(74) *Attorney, Agent, or Firm* — Young Basile Hanlon & MacFarlane, P.C.

(57) ABSTRACT

First information including operation information is exchanged via a first communication path. Second information including presentation information regarding parking control is exchanged via a second communication path. The presentation information is presented on an operation terminal. When a first evaluation value of the first communication path is less than a first threshold, at least part of the first information is exchanged via one or more other communication paths. When a second evaluation value of the second communication path is less than a second threshold, at least part of the second information is exchanged via one or more other communication paths, and an information amount of the first information and/or the second information is reduced. A vehicle is parked in accordance with a control instruction for moving along a parking route. The control instruction is based on the operation information which is input to the external operation terminal.

14 Claims, 15 Drawing Sheets

(58) Field of Classification Search
CPC ......... B62D 15/0285; G08G 1/096883; G08G 1/14; G08G 1/144; G08G 1/168; H04L 43/16; H04L 67/12; H04W 4/30
See application file for complete search history.

(56) References Cited

U.S. PATENT DOCUMENTS

| | | |
|---|---|---|
| 2013/0073119 A1* | 3/2013 | Huger .................. B62D 15/027 701/1 |
| 2014/0365032 A1 | 12/2014 | Park et al. |
| 2015/0375741 A1 | 12/2015 | Kiriya |
| 2016/0148450 A1 | 5/2016 | Ohshima |
| 2017/0278394 A1 | 9/2017 | Fuehrer |
| 2018/0022345 A1* | 1/2018 | Seo ....................... B60W 30/06 701/2 |
| 2018/0037262 A1 | 2/2018 | Imai |
| 2018/0144566 A1 | 5/2018 | Ohshima |

FOREIGN PATENT DOCUMENTS

| | | |
|---|---|---|
| JP | 2016-097927 A | 5/2016 |
| WO | 2013/041337 A1 | 3/2013 |
| WO | 2016/041689 A1 | 3/2016 |
| WO | 2016/158236 A1 | 10/2016 |

* cited by examiner

FIG.11

| Content of process | Parameter | | |
|---|---|---|---|
| | Usual | | Poor communication quality |
| Process of calculating parking route | First margin distance | < | Second margin distance |
| Process of calculating control instruction | First upper limit speed | > | Second upper limit speed |
| | First upper limit acceleration | > | Second upper limit acceleration |
| Selection of parking menu | Mode of entering or exiting parking space | < | Only rescue mode |

PARKING CONTROL METHOD AND PARKING CONTROL DEVICE

TECHNICAL FIELD

The present invention relates to a parking control method and a parking control apparatus.

BACKGROUND

A vehicle remote steering system is known, which operates to permit activation of the operation unit of a vehicle when authentication of two communication devices of an electronic key and a mobile communication device is successfully done (Japanese Patent Application JP2016-97927A).

SUMMARY

In the above conventional system, nothing is contemplated for a case in which the communication environment around the vehicle is poor.

A problem to be solved by the present invention is to execute a parking process by remote control even when the communication environment around the vehicle is poor.

The present invention solves the above problem through exchanging first information via a first communication path, the first information including operation information; exchanging second information via a second communication path, the second information including presentation information regarding parking control, the presentation information being presented on an operation terminal; and when a first evaluation value regarding communication quality of the first communication path is less than a first threshold, exchanging at least part of the first information via one or more other communication paths than the first communication path, while when a second evaluation value regarding communication quality of the second communication path is less than a second threshold, exchanging at least part of the second information via one or more other communication paths than the second communication path and reducing an information amount of the first information and/or the second information.

According to the present invention, parking control can be executed even when the communication quality is poor.

BRIEF DESCRIPTION OF THE DRAWINGS

FIG. 11 is a diagram for describing a process of changing parking route/control information.

DETAILED DESCRIPTION

Hereinafter, one or more embodiments of the present invention will be described with reference to the drawings. In the embodiments, the present invention will be described by exemplifying a case in which the parking control apparatus according to the present invention is applied to an onboard parking control system. The parking control apparatus may also be applied to a portable terminal device (equipment such as a smartphone or a PDA: Personal Digital Assistant) capable of exchanging information with an onboard apparatus. The parking control method according to the present invention can be used in the parking control apparatus, which will be described below.

Figure 1:
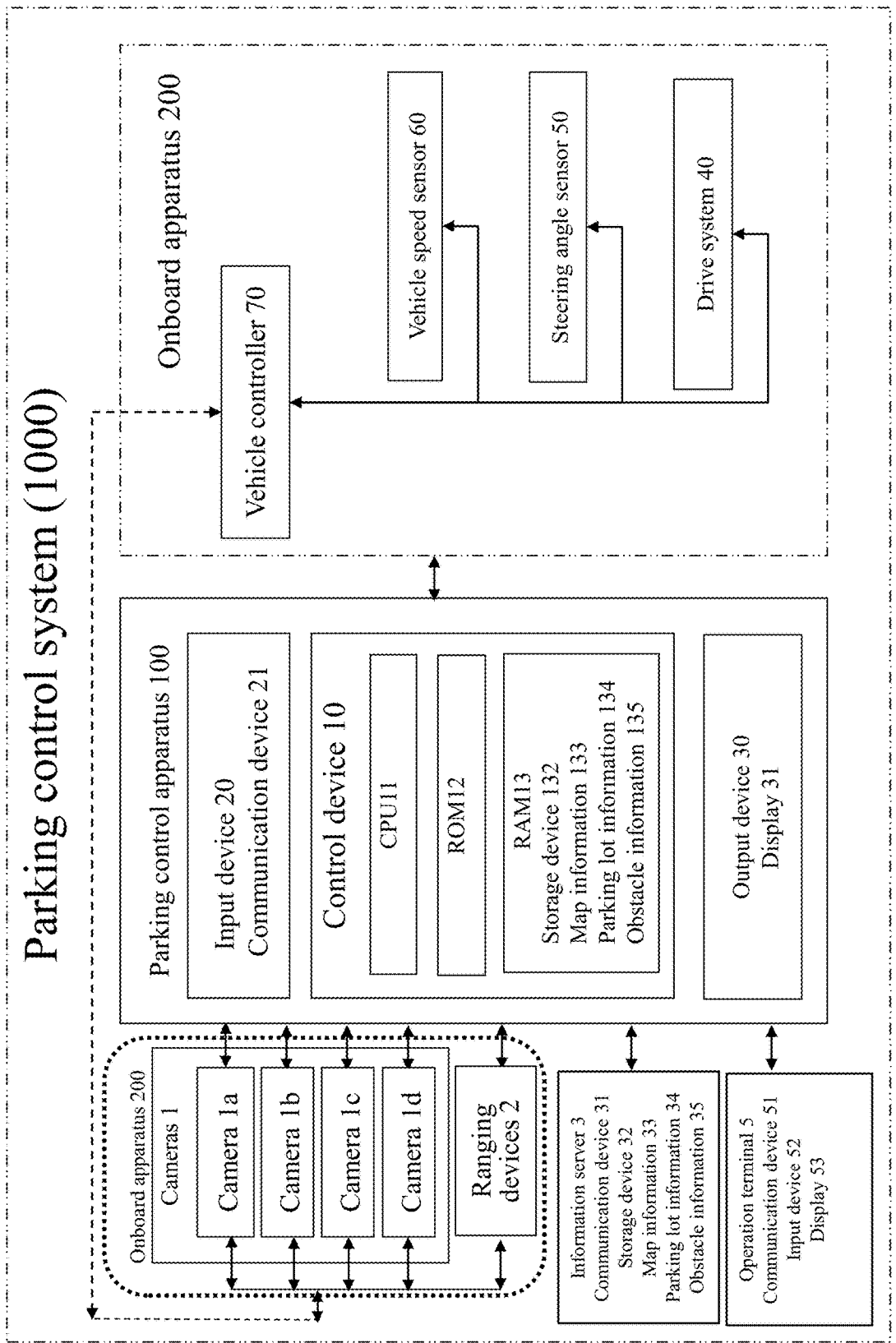
FIG. 1 is a block diagram illustrating an example of a parking control system according to one or more embodiments of the present invention.

FIG. 1 is a block diagram of a parking control system 1000 including a parking control apparatus 100 according to one or more embodiments of the present invention. The parking control system 1000 according to one or more embodiments of the present invention includes cameras 1a to 1d, ranging devices 2, an operation terminal 5, the parking control apparatus 100, a vehicle controller 70, a drive system 40, a steering angle sensor 50, and a vehicle speed sensor 60. The parking control apparatus 100 according to one or more embodiments of the present invention operates to control an operation of moving (parking) a vehicle into a parking space on the basis of operation information that is input to the operation terminal 5 from an operator. In the present description, the vehicle as a target of parking control is referred to as a vehicle V.

The operation terminal 5 is a portable computer that can be brought out to outside of the vehicle and has an input function and a communication function. The operation terminal 5 receives operation information for controlling the driving (operation) of the vehicle for parking. The operation information is input to the operation terminal 5 from an operator. The driving includes operations for parking (operations for entering a parking space and exiting the parking space). In other word, the operator uses the operation terminal 5 to input the operation information for execution of parking. The operation information includes a command for execution/stop of parking control, a command for selection/change of a target parking space, a command for selection/change of a parking route, and other information necessary for parking. The operator can also make the parking control apparatus 100 recognize the operation information and can input the operation information without using the operation terminal 5, such as by a gesture of the operator.

The operation terminal 5 includes a communication device and is capable of exchanging information with the parking control apparatus 100 and an information server 3. The operation terminal 5 transmits the operation information, which is input to the operation terminal 5 from an operator outside the vehicle, to the parking control apparatus 100 via a communication network and inputs the operation information to the parking control apparatus 100. The operation terminal 5 communicates with the parking control apparatus 100 using signals including a unique identification code. The operation terminal 5 detects the frequency of communication radio waves to be transmitted and received and the establishment and interruption of communication with a communication device 21 of the parking control apparatus 100.

The operation terminal 5 includes a display 53. To serve as an input interface, the display 53 presents various information items. When the display 53 is a touch panel-type display, this display 53 further includes an input device 52 and has a function of receiving the operation information. The operation terminal 5 may be portable equipment, such as a smartphone or a PDA: Personal Digital Assistant, in which applications are installed for receiving input of the operation information used in the parking control method according to one or more embodiments of the present invention and transmitting the operation information to the parking control apparatus 100.

The information server 3 is an information provision apparatus provided on a network capable of communication. The information server includes a communication device 31 and a storage device 32. The storage device 32 includes readable map information 33, parking lot information 34, and obstacle information 35. The parking control apparatus 100 and the operation terminal 5 can access the storage device 32 of the information server 3 to acquire each information item. The parking control apparatus 100 and the operation terminal 5 may acquire information on the position of a parking space, whether or not a vehicle is parked in the parking space, etc. from the information server 3.

The parking control apparatus 100 according to one or more embodiments of the present invention includes a control device 10, an input device 20, and an output device 30. These components of the parking control apparatus 100 are connected to one another via a controller area network (CAN) or other onboard LAN to mutually exchange information. The input device 20 includes a communication device 21. The communication device 21 receives the operation information transmitted from the external operation terminal 5 and inputs the operation information to the input device 20. The subject who inputs the operation information to the external operation terminal 5 may be a person (a user, a passenger, a driver, or a worker of a parking facility). The input device 20 transmits the received operation information to the control device 10. The output device 30 includes a display 31. The output device 30 notifies the driver of parking control information. The display 31 according to one or more embodiments of the present invention is a touch panel-type display having an input function and an output function. When the display 31 has an input function, it serves as the input device 20. Even when the vehicle is controlled on the basis of the operation information which is input to the operation terminal 5 from an operator outside the vehicle, an occupant (driver or passenger) can input another type of the operation information, such as information for emergency stop, via the input device 20. The output device 30 may include a speaker that presents information regarding the parking control.

The control device 10 of the parking control apparatus 100 according to one or more embodiments of the present invention is a specific computer including a ROM 12 that stores a parking control program, a CPU 11 as an operation circuit that executes the program stored in the ROM 12 to serve as the parking control apparatus 100 according to one or more embodiments of the present invention, and a RAM 13 that serves as an accessible storage device.

The parking control program according to one or more embodiments of the present invention is a program for evaluating the communication environment around the vehicle V and executing a control procedure in which the vehicle V is controlled to park in accordance with the evaluation result. This program is executed by the control device 10 of the parking control apparatus 100 according to one or more embodiments of the present invention.

The parking control apparatus 100 according to one or more embodiments of the present invention is a remote control-type apparatus that receives the operation information from external and controls the movement of the vehicle V to park the vehicle V into a given parking space. During this operation, the operator M may be located outside the vehicle V or may also be located inside the interior of the vehicle V.

The parking control apparatus 100 according to one or more embodiments of the present invention may be of an autonomous (automated) control type in which the steering operation and the accelerator/brake operation are performed in an autonomous manner. The parking control apparatus 100 may also be of a semiautonomous type in which the steering operation is performed in an autonomous manner while the driver performs the accelerator/brake operation. In the parking control program according to one or more embodiments of the present invention, the operator may arbitrarily select a target parking space, or the parking control apparatus 100 or the parking facility side may automatically set a target parking space.

In the parking control system 1000 according to one or more embodiments of the present invention, the control device 10 of the parking control apparatus 100 and the operation terminal 5 exchange information with each other and execute a parking control process for parking the vehicle V in accordance with a control instruction for moving the vehicle along a parking route. The control instruction is based on the operation information which is input to the operation terminal 5 located outside the vehicle V. The operation information including an operation command for executing the parking control process is input to the operation terminal 5 by an operator. Until the parking control process is completed after the operation information for commanding to start the parking control is input to the operation terminal 5, necessary presentation information regarding the parking control is exchanged between the operation terminal 5 and the control device 10. The presentation information includes operation information that announces the operator's intention, information for confirming exchange of information, presentation information provided for the operator to make a determination, and information for confirming the operator's intention.

The control device 10 has functions of executing an operation information acquisition process, a process of calculating an evaluation value of the communication quality of a communication path, a process according to the evaluation value, a process of calculating a parking route, and a process of calculating a control instruction for moving the vehicle V along the parking route. The process of calculating an evaluation value of the communication quality of a communication path and the process according to the evaluation value may be executed by the operation terminal 5. The operation terminal 5 according to one or more embodiments of the present invention is also a computer that includes a CPU, a RAM, and a ROM. The process according to the evaluation value of the communication quality includes a process of switching communication paths, a process of reducing the information amount of information to be transmitted and received, a process of calculating a parking route with changed parameters, and a process of calculating a control instruction with changed parameters. Each of the above processes is executed by cooperation of software for implementing the process and the above-described hardware.

The control device 10 according to one or more embodiments of the present invention embodies a parking control method for parking the vehicle V in accordance with a control instruction for moving along a parking route. The control instruction is based on the operation information which is input to an operation terminal located outside the vehicle V. The control device 10 operates to exchange first information via a first communication path and exchange second information via a second communication path. The first information includes the operation information. The second information includes presentation information regarding the parking control. The presentation information is presented on the operation terminal. When a first evaluation value regarding communication quality of the first communication path is less than a first threshold, the control device 10 operates to exchange at least part of the first information via one or more other communication paths than the first communication path. When a second evaluation value regarding communication quality of the second communication path is less than a second threshold, the control device 10 operates to exchange at least part of the second information via one or more other communication paths than the second communication path. When a process of switching the communication paths is performed, that is, when the communication quality of the first communication path and/or the second communication path is less than a predetermined threshold, the control device 10 operates further to execute a process of reducing an information amount of the first information and/or the second information, in addition to the above operation. Together with or independently of the process of reducing the information amount, the control device 10 operates to execute a process of changing the parking route or the control instruction for moving along the parking route when executing the process of switching the communication paths. In this case, the vehicle V is parked into a given parking space on the basis of the calculated control instruction.

In a remote parking control process, when exchange of information required by the operation terminal 5 and the control device 10 is performed using two or more communication paths and the communication quality of one of the communication paths is poor, the communication is performed using one or more other communication paths (another communication path). In addition to this, the information amount of the first information and/or the second information to be exchanged is reduced, and the remote parking control can therefore be executed even when the communication environment and the communication state are poor and the communication quality is lower than the required level. This can prevent a situation in which the remote parking control can be or cannot be executed depending on the communication quality. As a result, the reliability of the parking control apparatus 100 having the remote parking control function can be enhanced.

Moreover, when the communication quality of one of the first communication path and the second communication path is poor, communication is performed using one or more other communication paths. In addition to this, parameters used when calculating a parking route and/or parameters used in a process of calculating a control instruction for moving the vehicle V along the parking route are changed, and the parking process is executed on the basis of a different parking route or a different control instruction. Through this operation, even when the communication environment and the communication state are poor and the communication quality is lower than the required level, the remote parking control can be executed. This can prevent a situation in which the remote parking control can be or cannot be executed depending on the communication quality. As a result, the reliability of the parking control apparatus 100 having the remote parking control function can be enhanced.

Figure 2:
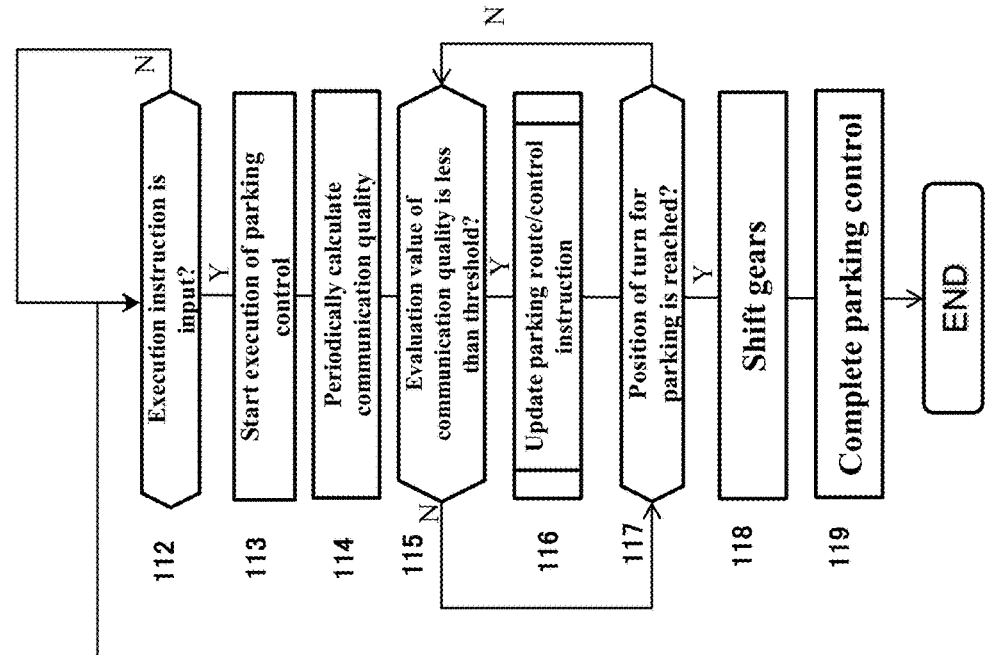
FIG. 2 is a flowchart illustrating an example of a control procedure executed by the parking control system according to one or more embodiments of the present invention.
Figure 2:
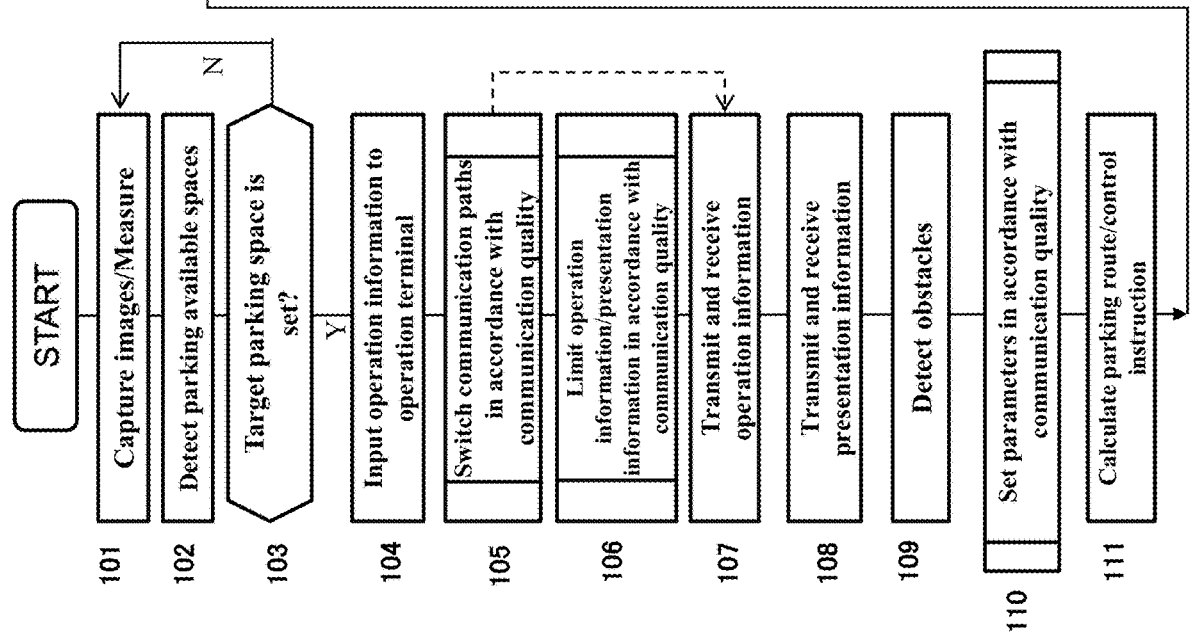

FIG. 2 is a flowchart illustrating a control procedure of the parking control process executed by the parking control system 1000 according to one or more embodiments of the present invention. The trigger for starting the parking control process is not particularly limited, and the parking control process may be triggered by the operation of a start switch of the parking control apparatus 100.

The parking control apparatus 100 according to one or more embodiments of the present invention has a function of moving the vehicle V to a parking space in an autonomous manner on the basis of the operation information acquired from outside of the vehicle.

In step 101, the control device 10 of the parking control apparatus 100 according to one or more embodiments of the present invention acquires images captured by the cameras 1a to 1d attached to multiple sites of the vehicle V. Although not particularly limited, the camera 1a is disposed on the front grille part of the vehicle V, the camera 1d is disposed in the vicinity of the rear bumper, and the cameras 1b and 1c are disposed on the lower parts of the right and left door mirrors. The cameras 1a to 1d for use may each be a camera having a wide-angle lens with a wide view angle. The cameras 1a to 1d capture images of boundary lines of parking spaces around the vehicle V and objects existing around the parking spaces. The cameras 1a to 1d may be CCD cameras, infrared cameras, or other appropriate imaging devices.

In step 101, the control device 10 also acquires ranging signals from the ranging devices 2 which are attached to multiple sites of the vehicle V.

The ranging devices 2 may be provided at the same positions as the cameras 1a to 1d or may also be provided at different positions. The ranging devices 2 for use may each be a radar device, such as a millimeter-wave radar device, a laser radar device or an ultrasonic radar device, or a sonar device. The ranging devices 2 detect the presence or absence of objects, positions of the objects, sizes of the objects, and distances to the objects on the basis of the received signals of the radar devices. Such objects include installed subjects, pedestrians, other vehicles, and parked vehicles around the vehicle V. The received signals are used to make a determination whether or not a parking space is empty (whether or not a vehicle is parked in the parking space). Obstacles may be detected using the motion stereo technique by the cameras 1a to 1d.

In step 102, the control device 10 of the parking control apparatus 100 uses an image processing function to generate an overhead image. On the basis of the acquired plurality of captured images, the image processing function may serve to generate an overhead image in which the surrounding state including the vehicle V and the parking space for the vehicle V to park is viewed from a virtual viewpoint P (not illustrated) above the vehicle V.

In step 103, the control device 10 detects parking spaces into which parking is possible. The control device 10 performs edge detection on the basis of the captured images from the cameras 1a to 1d and detects the parking spaces, which are defined by boundary lines, on the basis of the luminance difference (contrast). After detecting the parking spaces, the control device 10 detects empty parking spaces using the detection data of the ranging devices 2. The control device 10 detects parking available spaces from among the parking spaces. The parking available spaces are parking spaces which are empty (i.e., other vehicles are not parked) and to which routes for completing the parking can be derived. Information on parking spaces that are available may also be acquired from the information server 3. The condition that a route can be derived means that a trajectory of the route can be rendered on road surface coordinates without interfering with obstacles (including parked vehicles). In practice, an accurate parking route for controlling the vehicle V is derived after a target parking space is set.

In one or more embodiments of the present invention, the operator performs a so-called remote parking process in which the operator gets off the vehicle V and parks the vehicle V from the outside. In step 104, the operator who gets off the vehicle inputs the operation information regarding the parking process to the operation terminal 5. The operation information includes at least an instruction for starting the parking process. The operation information is transmitted to the control device 10.

In the parking control system 1000 according to one or more embodiments of the present invention, the control device 10 and the operation terminal 5 exchange information using two or more communication paths. The communication device 21 of the parking control apparatus 100 and a communication device 51 of the operation terminal 5 each have two or more communication functions using respective communication paths. In the parking control system 1000, the control device 10 and the operation terminal 5 exchange information using the first communication path and the second communication path. In addition, the control device 10 and the operation terminal 5 can exchange information using a third communication path that is different from the first communication path and the second communication path. The control device 10 and the operation terminal 5 exchange information using two communication paths: the first communication path and the second communication path. The control device 10 and the operation terminal 5 can exchange information using three communication paths: the first communication path; the second communication path; and the third communication path. In an alternative embodiment, the control device 10 and the operation terminal 5 may be able to exchange information using four or more communication paths. In this example, a case of using two communication paths and a case of using three communication paths will be described.

Figure 3:
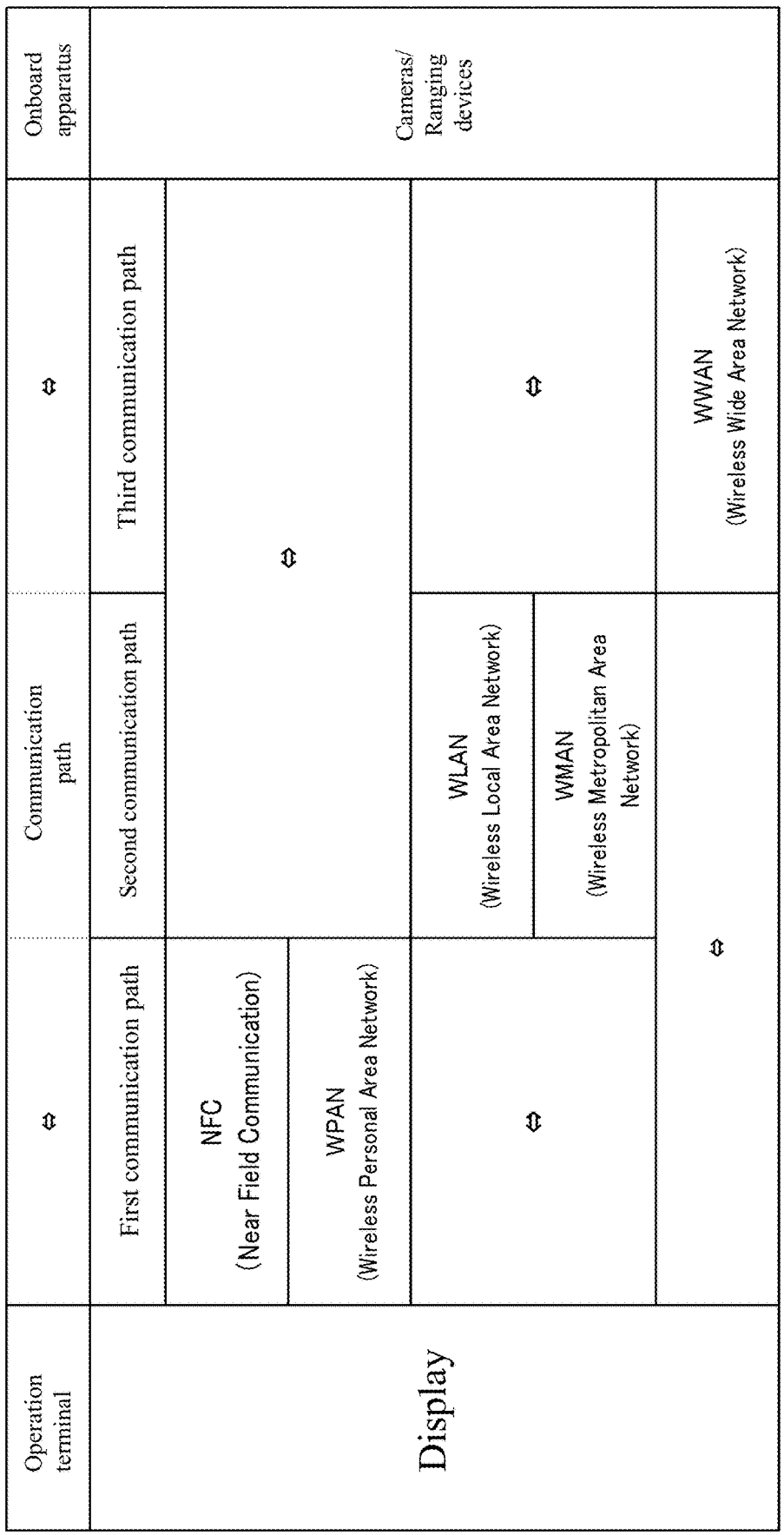
FIG. 3 is a diagram illustrating examples of communication paths.

FIG. 3 illustrates communication paths used in one or more embodiments of the present invention. In one or more embodiments of the present invention, the first to third communication paths are used. Each communication path will be described.

As illustrated in FIG. 3, the first communication path can use short-range wireless communication or close-range wireless communication. The communicable distance of the first communication path is about 10 to 20 m or several tens of meters. Short-range wireless communication includes wireless PAN: Wireless Personal Area Network, NFC: Near field radio communication, DSRC: Dedicated Short Range Communications, specific low-power radio, or weak radio. Close-range wireless communication: WPAN (Wireless Near Field Communication) includes Bluetooth (registered trademark), UWB: Ultra Wide Band, or ZigBee (registered trademark). In this system, Bluetooth (registered trademark) is used as the first communication path.

The second communication path uses a wireless LAN: Wireless Local Area Network or a wireless MAN: Wireless Metropolitan Area Network. The communicable distance of the second communication path is about 100 m or less or 100 km or less. In this system, Wi-Fi (wireless LAN) is used as the second communication path.

The third communication path can use a wide area wireless network or a wireless WAN: Wireless Wide Area Network. The wireless WAN is a network in which remote networks are connected by one or more communication lines. This is a wireless network that can communicate with the Internet or the like via a base station, such as a mobile phone network. In this system, a mobile phone network is used as the third communication path.

Although not particularly limited, the first information including the operation information is highly important information that conveys the operator's intention to the parking control apparatus 100, so it is preferred to use a communication path with relatively high security. The first information including the operation information is information that should convey the operator's intention promptly (without delay) to the parking control apparatus 100, so it is preferred to use a communication path with a relatively high communication speed.

As illustrated in FIG. 3, communication is performed between the operation terminal 5 including the display 53 and the onboard cameras 1a to 1d and ranging devices 2 using any of the first to third communication paths.

In one or more embodiments of the present invention, the first information including the operation information and the second information including presentation information regarding the parking control to be presented to the operator are transmitted and received via different communication paths. In this example, the first information is exchanged via the first communication path, and the second information is transmitted and received via the second communication path. The first information and the second information are identified on the basis of respective identifiers assigned to the first information and the second information. The communication device 51 of the operation terminal 5 and the communication device 21 of the parking control apparatus 100 each have communication protocols of the first to third communication paths which may be used and software and hardware for communication processing. Each of the communication device 51 and the communication device 21 identifies the first information or the second information on the basis of the identifier and transmits and receives information using the communication paths associated with the first information and the second information.

In step 105, the control device 10 and/or the operation terminal 5 perform a process of switching communication paths in accordance with the communication quality. The communication quality is quantitatively evaluated in accordance with an evaluation value. Any one or more of the S/N ratio, latency, and throughput of communication and the communication interruption time can be used as the evaluation value of the communication quality. The S/N ratio refers to the ratio of signal to noise. The S/N ratio includes signal-noise ratio or signal-to-noise ratio. The higher the S/N ratio, the higher the evaluation of the communication quality, while the lower the S/N ratio, the lower the evaluation of the communication quality. The latency refers to a communication delay time from when a transfer request is issued to when data is actually received. The longer (larger value) the latency, the lower the evaluation of the communication quality, while the shorter (smaller value) the latency, the higher the evaluation of the communication quality. The throughput refers to a value that represents the transmission amount (information amount) per unit time of a communication line to be used. The higher the throughput, the higher the evaluation of the communication quality, while the lower the throughput, the lower the evaluation of the communication quality. The communication interruption time refers to a time from communication interruption to recovery. The shorter the communication interruption time, the higher the evaluation of the communication quality, while the longer the communication interruption time, the lower the evaluation of the communication quality.

Evaluation thresholds (first evaluation threshold, second evaluation threshold, and third evaluation threshold) can be preliminarily set. The evaluation thresholds can be appropriately set in accordance with the importance/urgency of the information in the parking process. For example, the operation information is highly important in the execution of the parking process, and the response speed between the operation terminal 5 and the control device 10 has to be fast. The first evaluation threshold is therefore set high. By setting the first evaluation threshold high, when the communication quality of the first communication path is low, the process of switching to another communication path is immediately performed, and smooth exchange of the operation information can be ensured. The evaluation thresholds can of course be set with consideration for the unique S/N ratio, latency, throughput, and communication interruption time of each communication path. In practice, the evaluation thresholds can be experimentally set while actually executing the parking process.

When the first evaluation value regarding the communication quality of the first communication path is less than the first threshold, the control device 10 and/or the operation terminal 5 exchange at least part of the first information via one or more other communication paths than the first communication path, while when the second evaluation value regarding the communication quality of the second communication path is less than the second threshold, the control device 10 and/or the operation terminal 5 exchange at least part of the second information via one or more other communication paths than the second communication path. That is, when the communication quality is lower than a predetermined value, communication is continued by allocating information to be transmitted and received to another communication path. All of the first information may be allocated to another communication path, or part of the first information may be allocated to another communication path. Another communication path for use may be any one of the first communication path and the second communication path, which are used as default paths, or may also be a third communication path other than the first and second communication paths. The operation information of the first information includes operation commands (a parking start command, a target parking space setting command, a stop command, and an input time) that are input by the operator, a request for acknowledgement of an operation command, a request for necessary information for the next action, etc.

The first information including the operation information may be divided so that only part of the first information is transmitted and received via the first communication path and the remaining first information is transmitted and received via another communication path. Likewise, the presentation information of the second information includes detection information from various sensors such as the onboard ranging devices 2, images captured by the cameras 1a to 1d, a selection menu for selecting a parking mode that is narrowed down on the basis of the detection information and/or the captured images, etc. The second information including the presentation information may be divided so that only part of the second information is transmitted and received via the second communication path and the remaining second information is transmitted and received via another communication path. Thus, by dividing the first information and/or the second information and transmitting and receiving each divided part of the information via one or more different communication paths, even when the communication quality becomes poor, exchange of information between the operation terminal 5 and the control device 10 is ensured, and the execution of the parking process can therefore be continued.

Figure 4A:
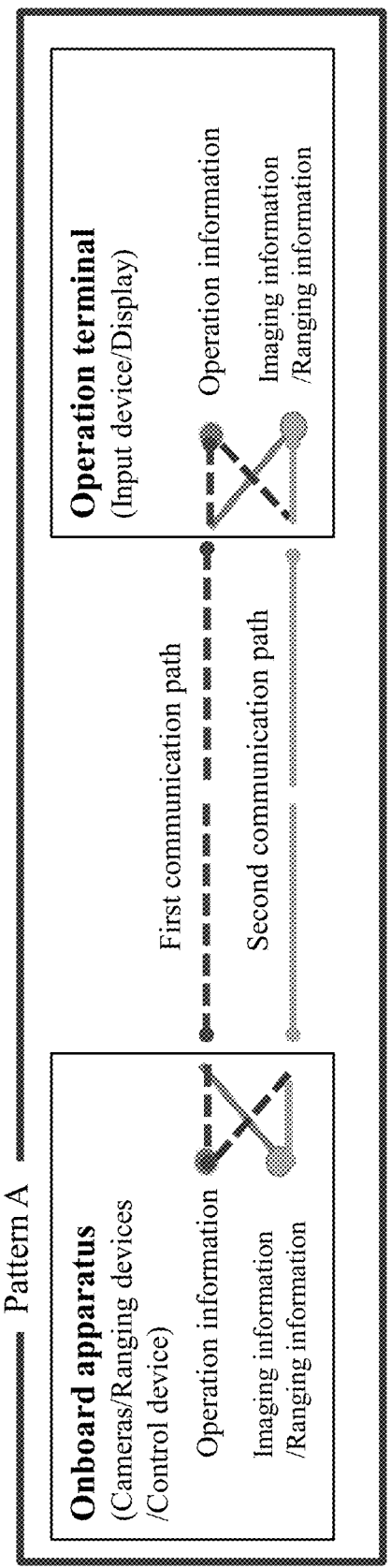
FIG. 4A is a first diagram for describing a process of switching communication paths.
Figure 4B:
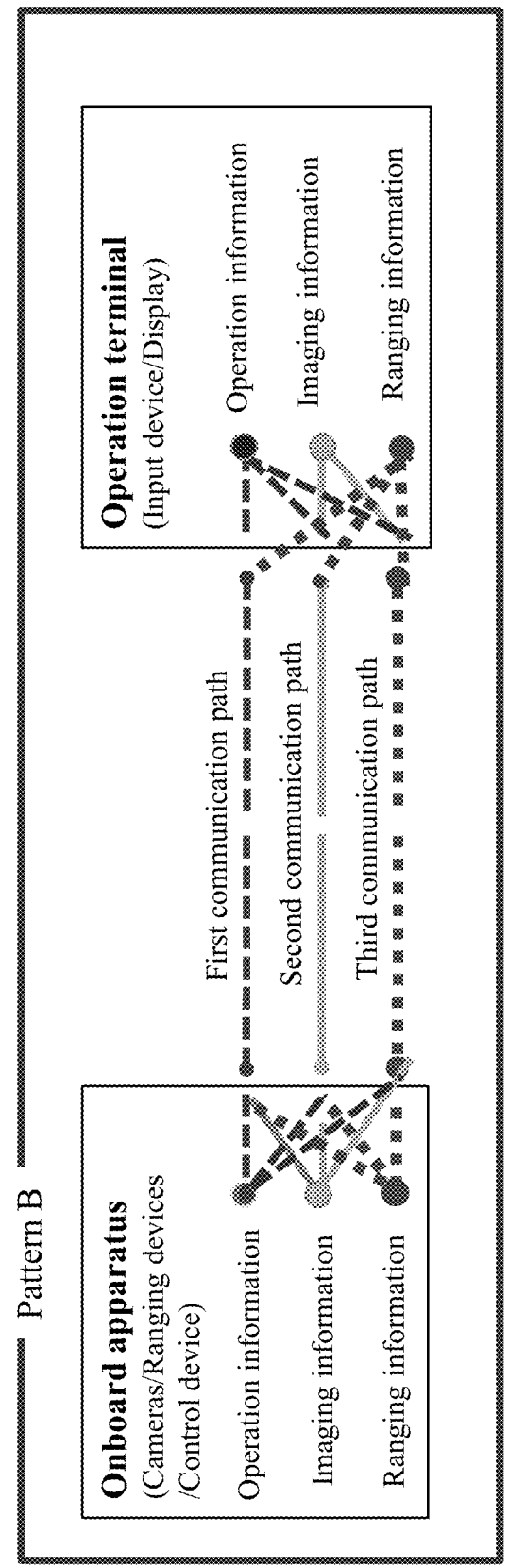
FIG. 4B is a second diagram for describing a process of switching communication paths.

FIG. 4A and FIG. 4B are each a diagram illustrating a form of switching communication paths. FIG. 4A illustrates a form of the process of switching communication paths when using two communication paths: the first and second communication paths.

As illustrated in FIG. 4A, in principle, the operation information (first information) which is input to the operation terminal 5 from an operator outside the vehicle is transmitted and received between the operation terminal 5 and the onboard apparatus via the first communication path, while the images captured by the cameras 1a to 1d of the onboard apparatus (second information), the detection information from the ranging devices 2 (second information), and the determination information made by the control device 10 (second information) are transmitted and received between the onboard apparatus and the operation terminal 5 via the second communication path. The detection information from the ranging devices 2 includes information on the presence or absence of an obstacle and the existence position of the obstacle. When the communication quality of the first communication path is low, the control device 10 and the operation terminal 5 transmit and receive the operation information (first information) using the second communication path other than the first communication path. When the communication quality of the second communication path is low, the control device 10 and the operation terminal 5 transmit and receive the presentation information (second information) using the first communication path other than the second communication path.

FIG. 4B illustrates a form of the process of switching communication paths when using any one or more of three communication paths: the first to third communication paths. Also when three communication paths are used, in principle, the operation information (first information) which is input to the operation terminal 5 from an operator located outside the vehicle is transmitted and received between the operation terminal 5 and the onboard apparatus via the first communication path, while the images captured by the cameras 1a to 1d of the onboard apparatus (second information), the detection information from the ranging devices 2 (second information), and the determination information made by the control device 10 (second information) are transmitted and received between the onboard apparatus and the operation terminal 5 via the second communication path. The detection information from the ranging devices 2 includes information on the presence or absence of an obstacle and the existence position of the obstacle. When the communication quality of the first communication path is low, the control device 10 and the operation terminal 5 transmit and receive the operation information (first information) using the second and/or third communication paths which are not the first communication path. When the communication quality of the second communication path is low, the control device 10 and the operation terminal 5 transmit and receive the presentation information (second information) using the first and/or third communication paths which are not the second communication path.

In this case, part of the first information and/or part of the second information can be transmitted and received via one or more other communication paths. The imaging information of the second information may be transmitted and received via the second communication path while the ranging information of the second information may be transmitted and received via the third communication path.

Figure 5:
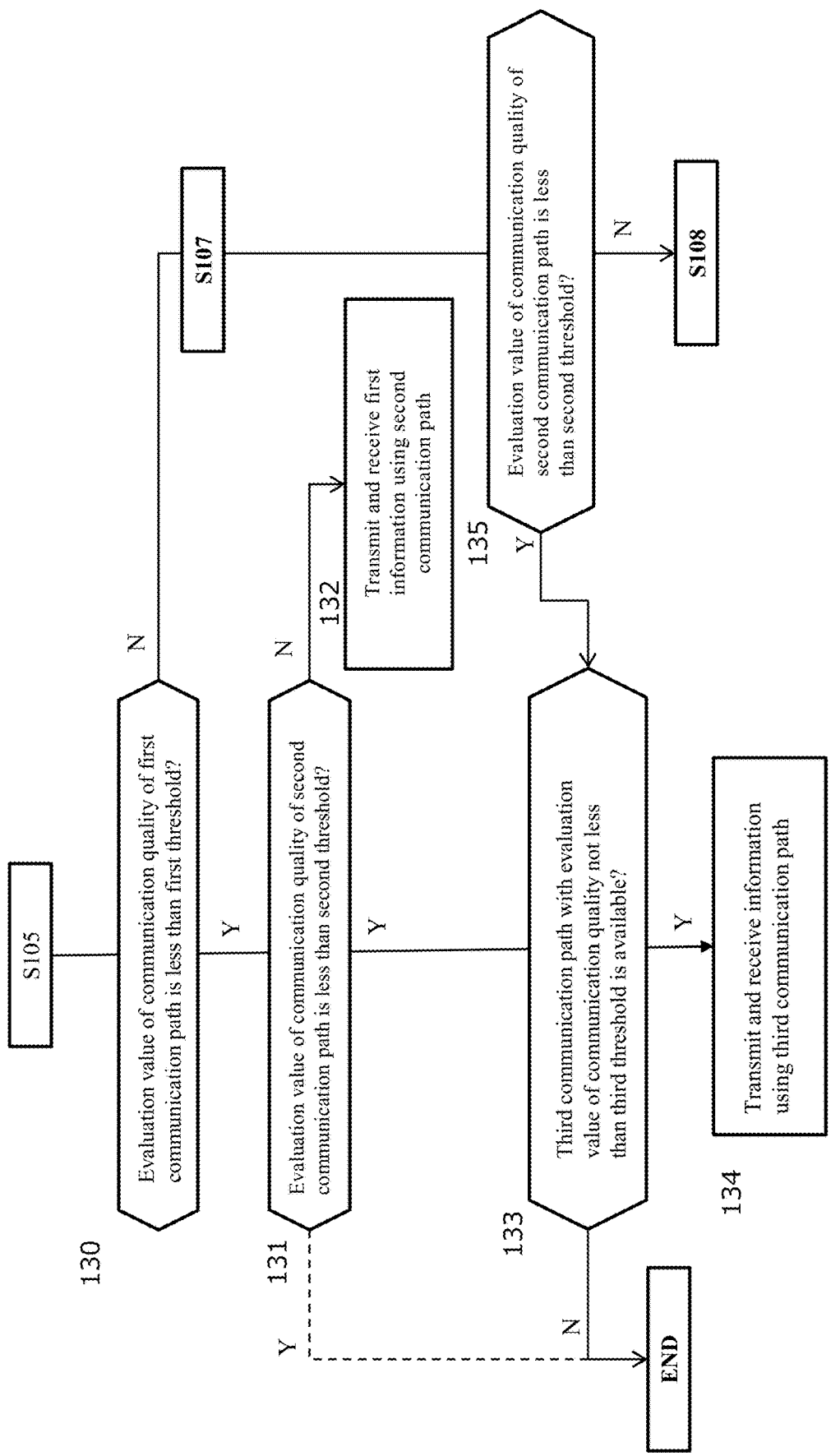
FIG. 5 is a flowchart illustrating an example of a process of switching communication paths.

FIG. 5 illustrates a subroutine of the process of step 105. In step 130, a determination is made as to whether or not the evaluation value of the communication quality of the first communication path is less than the first threshold. A negative determination (determination that the communication quality is good) is followed by step 107 of FIG. 2, in which the first information including the operation information is transmitted and received using the first communication path. Successful transmission and reception of the first information are followed by step 135, in which a determination is made as to whether or not the communication quality of the second communication path is less than the second threshold. A negative determination (determination that the communication quality is good) is followed by step 108 of FIG. 2, in which the second information including the presentation information is transmitted and received using the second communication path. When, in step 130, the evaluation value of the communication quality of the first communication path is less than the first threshold, the process proceeds to step 131, in which a determination is made as to whether or not the evaluation value of the communication quality of the second communication path is less than the second threshold. When the evaluation value of the second communication path is not less than the second threshold, the process proceeds to step 132, in which the first information is transmitted and received using the second communication path. At this time, when the evaluation value of the communication quality of the third communication path is not less than the third threshold, the first information may be transmitted and received using the third communication path. In a case in which only two communication paths are used, when the communication quality is poor both in the first and second communication paths in step 131, the process is ended.

When, in step 131 or 135, the evaluation value of the second communication path is less than the second threshold, the process proceeds to step 133. The communication quality is less than the predetermined thresholds in the first communication path and in the second communication; therefore, in this case, it is confirmed that the third communication path with an evaluation value not less than the third threshold is available, and the first and second information is transmitted and received using the third communication path. When a negative determination is made in step 133, the process is ended.

One or more other communication paths used when the communication quality is low in the first communication path and/or in the second communication path may be not only the first communication path and/or the second communication path, which are set as default paths, but also the third communication path other than the first communication path and the second communication path. Thus, the one or more other communication paths are used when the communication quality of a communication path is low, and the parking process can therefore be continued even if the communication quality becomes poor.

In step 106 of FIG. 2, the control device 10 and/or the operation terminal 5 reduce the information amount of the first information including the operation information and the second information including the presentation information in accordance with the communication quality.

When the first evaluation value regarding the communication quality of the first communication path is less than the first threshold, the control device 10 and/or the operation terminal 5 reduce the information amount of the operation information and/or the presentation information in addition to performing the process of exchanging at least part of the first information via one or more other communication paths than the first communication path. When the second evaluation value regarding the communication quality of the second communication path is less than the second threshold, the control device 10 and/or the operation terminal 5 reduce the information amount of the operation information and/or the presentation information in addition to performing the process of exchanging at least part of the second information via one or more other communication paths than the second communication path.

Figure 6:
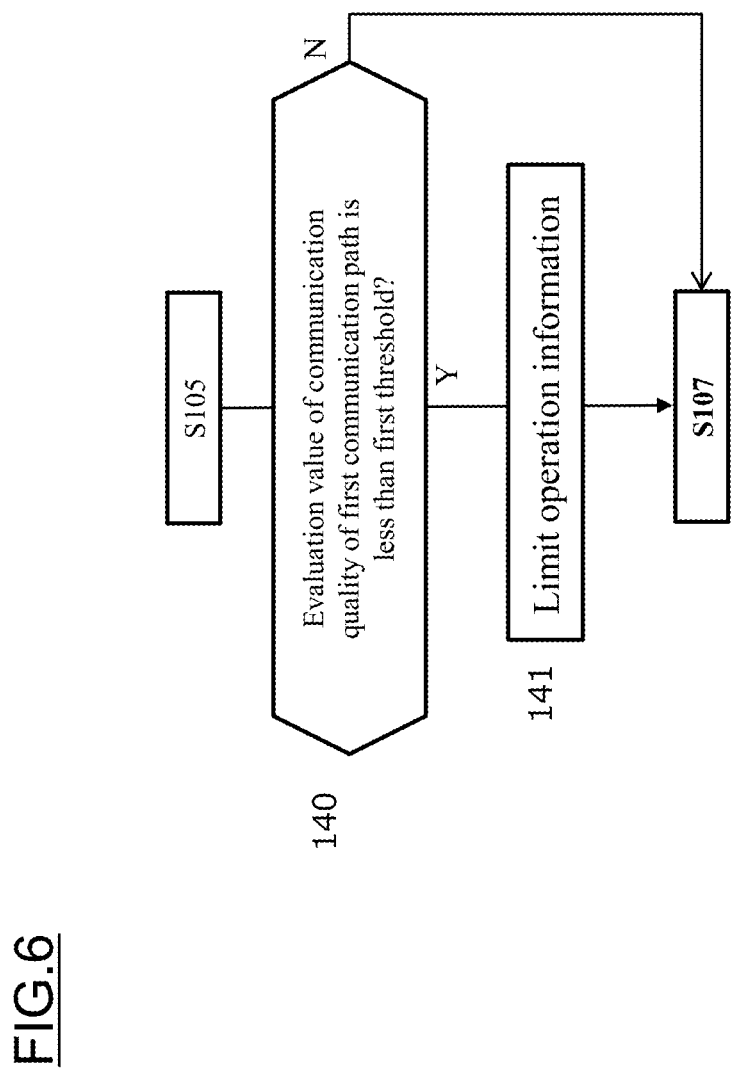
FIG. 6 is a flowchart illustrating an example of a process of limiting operation information.

FIG. 6 illustrates a subroutine of step 106 of FIG. 2. When, in step 140, the first evaluation value regarding the communication quality of the first communication path is less than the first threshold, the operation information is limited in step 141. Then, the process proceeds to step 107 of FIG. 2, in which the operation information with the reduced information amount is transmitted via the first communication path. The control device 10 and/or the operation terminal 5 reduce the types of enterable information of the operation information thereby to reduce the information which the operator can input, so that the exchange of information can be ensured even after the communication paths are switched. This allows the parking process to be continued even when the communication quality becomes poor.

Figure 7A:
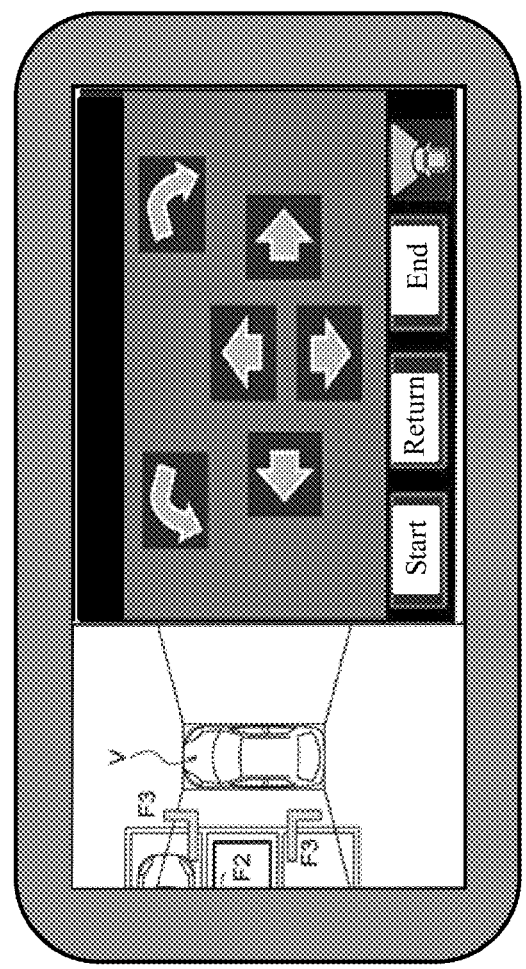
FIG. 7A is a first diagram for describing a process of limiting operation information.
Figure 7B:
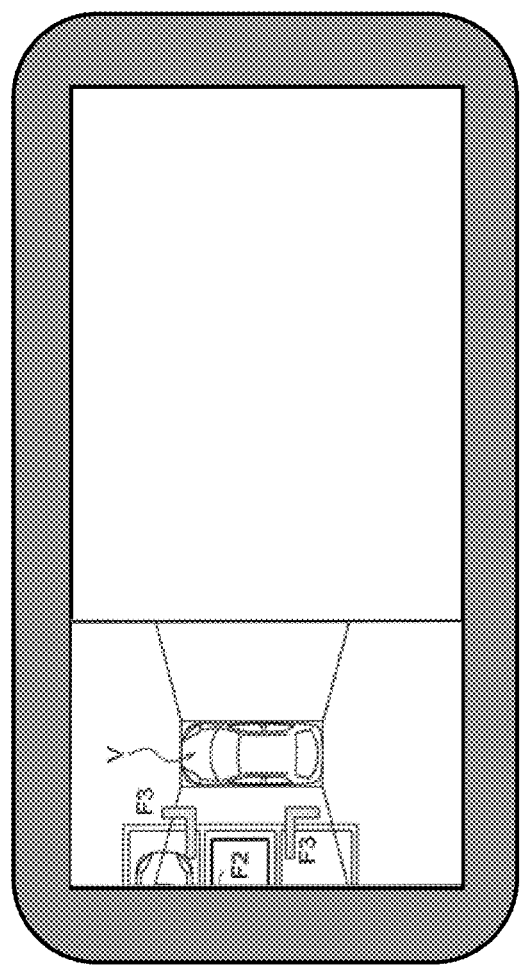
FIG. 7B is a second diagram for describing a process of limiting operation information.

FIG. 7A illustrates information displayed on the display 53 when finely adjusting the target parking position in the parking process. Arrows in the figure represent buttons for finely adjusting the target parking position when the vehicle V is moved to a target parking space F2 instructed by target parking frames F3. Touch on each arrow allows the target parking frames F3 and the target parking space F2 to move in the direction of the arrow. As illustrated in FIG. 7B, the control device 10 and/or the operation terminal 5 may omit the arrow buttons for fine position adjustment illustrated in FIG. 7A as a form of the process of reducing the types of enterable information of the operation information. The fine adjustment of the parking position requires frequent exchange of information. From the viewpoint of reducing the information amount, the input and output of the first information and the second information regarding the fine adjustment of the parking position are limited thereby to allow the process of parking control to be continued even though the fine adjustment of the parking position cannot be performed.

Figure 7C:
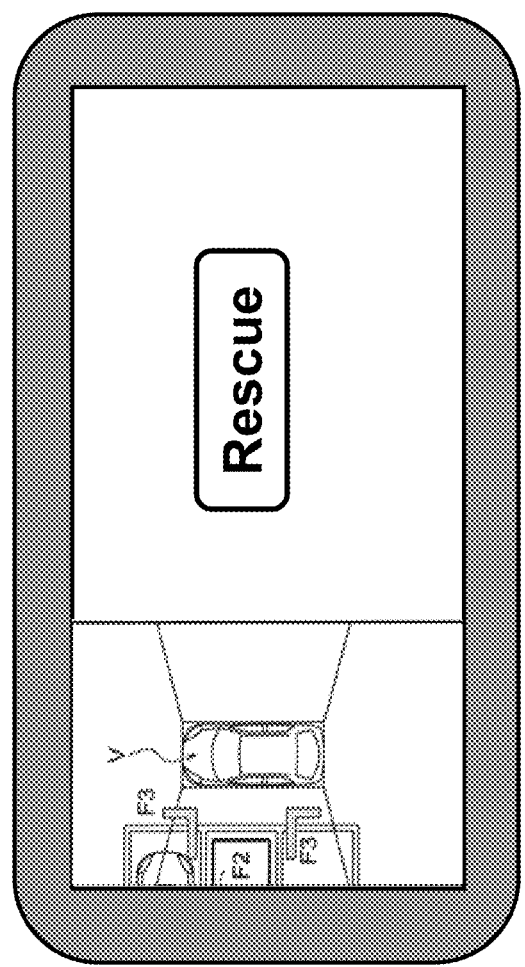
FIG. 7C is a third diagram for describing a process of limiting operation information.

The control device 10 and/or the operation terminal 5 may limit the enterable parking mode of the operation information to a recovery mode (rescue mode) in a direction away from the parking target position. Display of buttons for receiving an input of selection of a parking mode other than the recovery mode is omitted. When the display of the recovery mode (rescue mode) is selected and the parking control in the recovery mode is executed, the vehicle V is moved in a direction away from the parking target position. For example, the vehicle V may be moved to the start position (position when the parking process is started). In this case, the arrow buttons for fine position adjustment illustrated in FIG. 7A may be omitted, and only a selection button for the rescue mode may be displayed as illustrated in FIG. 7C. This allows the rescue mode to be immediately activated when the communication quality is poor, and the vehicle V can be moved to the original position. The parking process can be continued even when the communication situation is poor.

Figure 8:
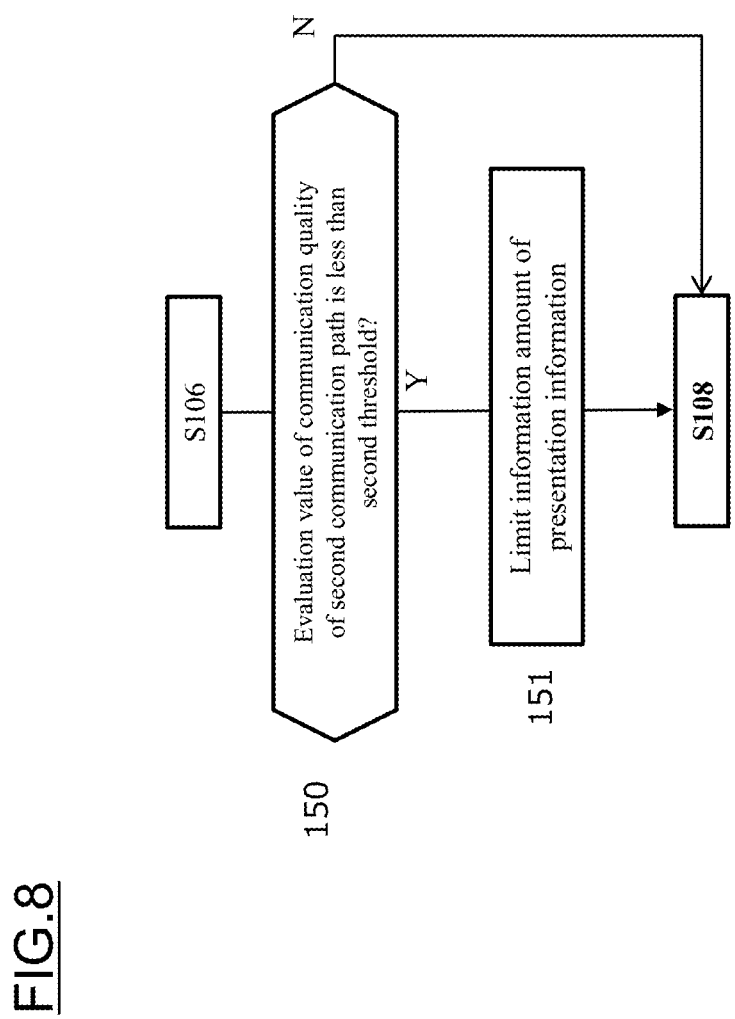
FIG. 8 is a flowchart illustrating an example of a process of limiting presentation information.

FIG. 8 illustrates a subroutine of step 106 of FIG. 2. When, in step 150, the first evaluation value regarding the communication quality of the first communication path is less than the first threshold, the information amount of the presentation information is limited in step 151. Then, the process proceeds to step 108 of FIG. 2, in which the presentation information with the reduced information amount is transmitted via the second communication path.

Figure 9A:
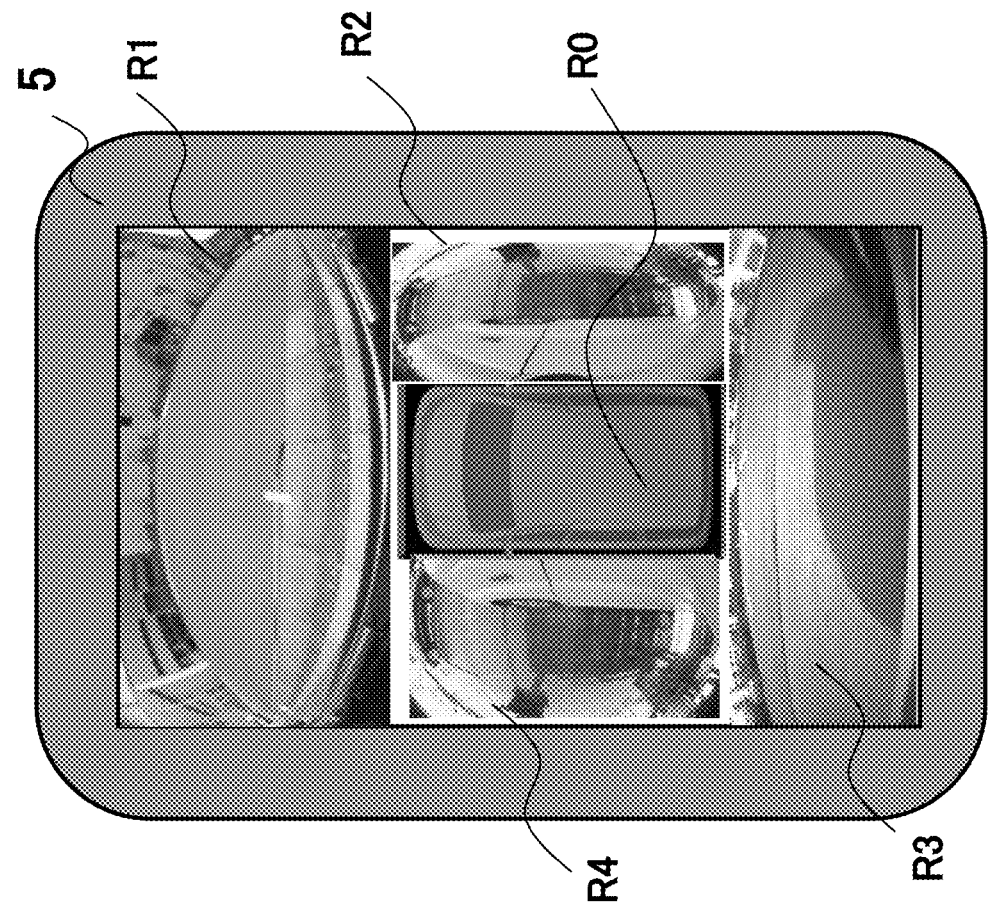
FIG. 9A is a first diagram for describing a process of limiting presentation information.

FIG. 9A is an example of the presentation information in which images captured by the cameras 1a to 1d are displayed on the display 53 in the parking process. The presentation information illustrated in the figure includes a captured image R1 of the front area of the vehicle V, a captured image R2 of the right-side area, a captured image R3 of the rear area, a captured image R4 of the left-side area, and an image R0 of the vehicle V. The operator can observe the situation around the vehicle V from the captured images. The control device 10 and/or the operation terminal 5 present the presentation information with a reduced information amount. Specifically, new second presentation information may be presented, which is created by reducing the number of pixels or resolution of the captured images in first presentation information that is created with the pixel number or resolution of the initial condition. Additionally or alternatively, the new second presentation information may be presented, in which the number, size, number of colors, and the like of the captured images in the first presentation information are reduced. Additionally or alternatively, the new second presentation information may be presented, which is created by shortening the cycle of capturing the images in the first presentation information which is created at the cycle of the initial condition. By reducing the information amount of the image information, even when the quality of a communication path becomes poor, the information can be exchanged to continue the parking process.

Figure 9B:
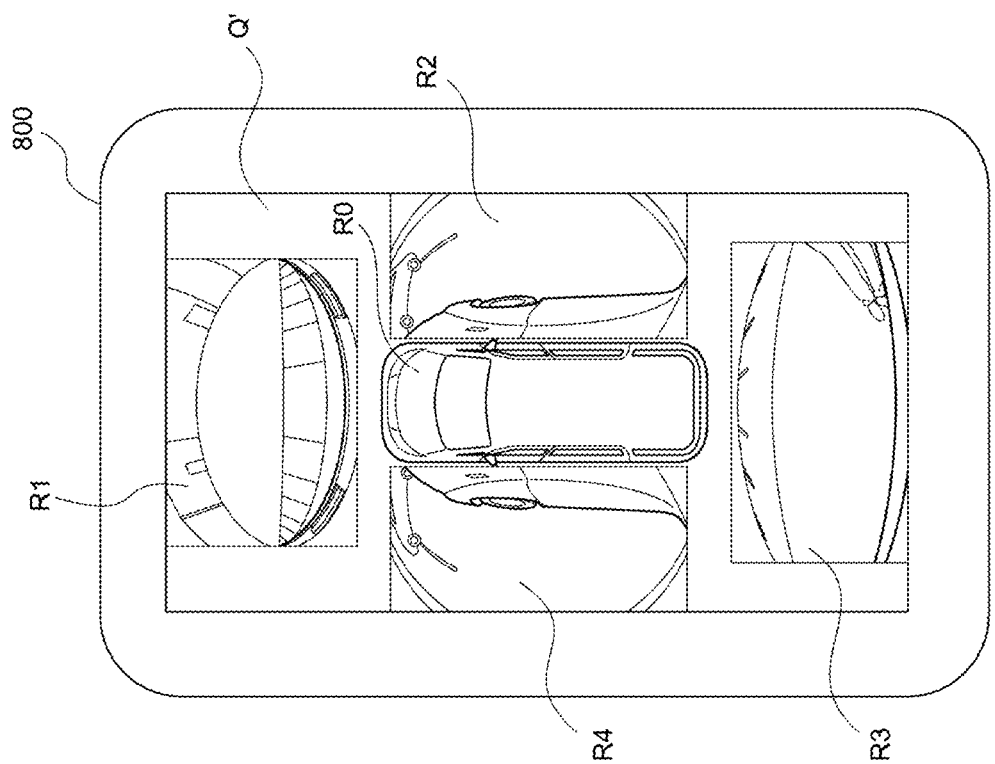
FIG. 9B is a second diagram for describing a process of limiting presentation information.

As illustrated in FIG. 9B, the control device 10 and/or the operation terminal 5 may change the image information, such as the captured images illustrated in FIG. 9A, into diagrammatic views as a form of reducing the information amount of the presentation information illustrated in FIG. 9A. By changing the image information into one or more diagrammatic views to reduce the information amount of the presentation information, even when the quality of a communication path becomes poor, the information can be exchanged to continue the parking process.

Figure 9C:
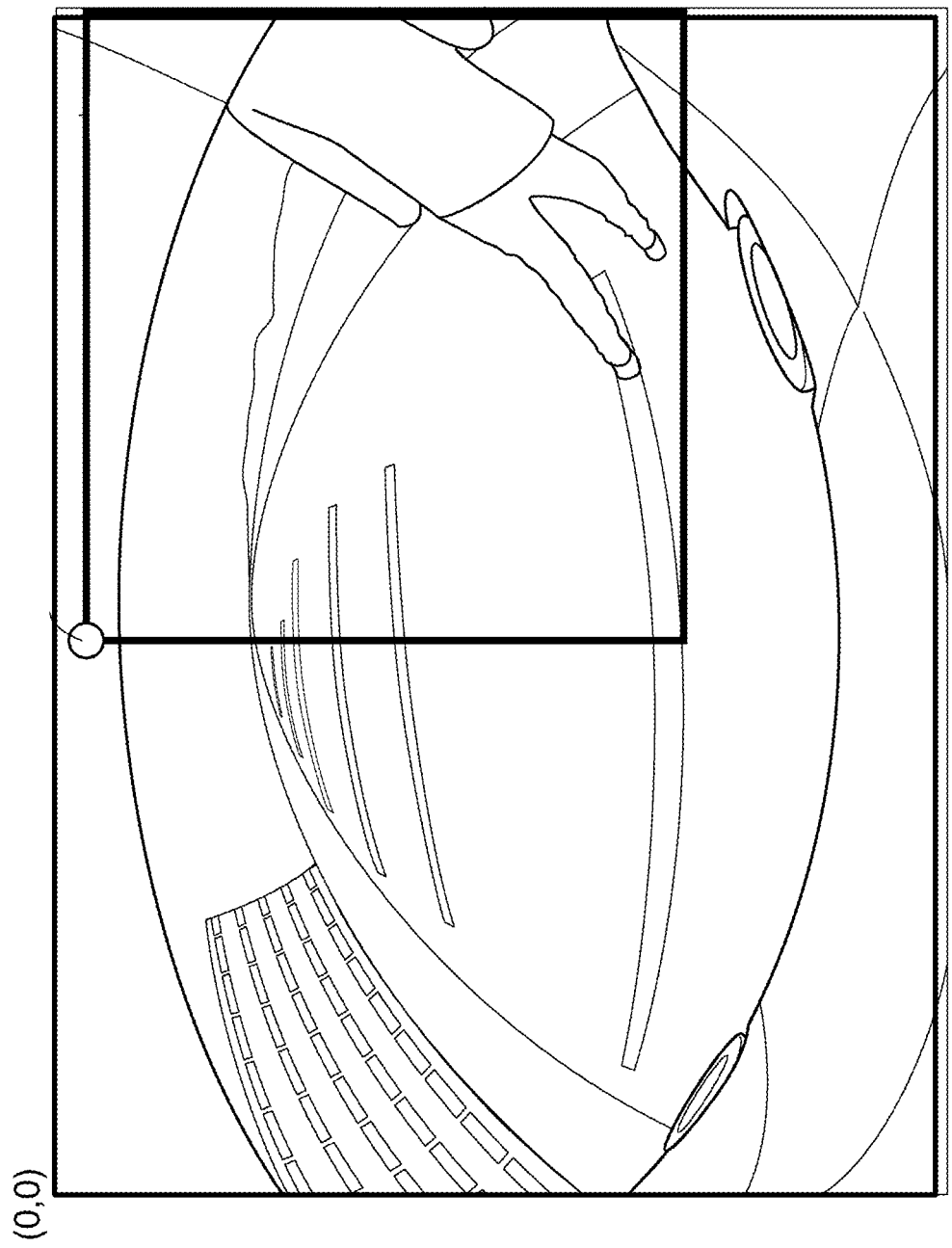
FIG. 9C is a third diagram for describing a process of limiting presentation information.

The control apparatus 10 and/or the operation terminal 5 may reduce the number of content types included in the presentation information as a form of reducing the information amount of the presentation information illustrated in FIG. 9A. Specifically, in the all-round captured images of the vehicle V illustrated in FIG. 9A, a captured image only of a partial area may be displayed as the presentation information. In this case, image information of an area in which an obstacle exists may be displayed. According to the captured images of the presentation information illustrated in FIG. 9A, an obstacle exists only in the rear area. The control device 10 and/or the operation terminal 5 may reduce the number of content types included in the presentation information illustrated in FIG. 9A and use only the image information of an area in which an obstacle exists as illustrated in FIG. 9C, as the presentation information. By reducing the number of content types included in the presentation information, even when the quality of a communication path becomes poor, the information can be exchanged to continue the parking process. As illustrated in the figure, the image information may be changed into a diagrammatic view.

The presentation information may be information on an obstacle detected by the ranging devices 2. FIG. 9C illustrates information on a pedestrian detected by the ranging devices 2. Only a portion surrounded by the rectangular frame in which the pedestrian is seen may be used as the presentation information, rather than using the entire rear area.

The operation information includes an instruction for starting the parking process and designation information of a target parking space into which it is desired to park the vehicle V. The target parking space is input via the operation terminal 5. The target parking space is a parking space into which the vehicle V is parked by executing movement, such as forward movement, backward movement, and turning, in an autonomous manner without the driver's operation. The target parking space is thus represented by a parking target position in the autonomous driving. For example, when the display 53 is a touch panel-type display, the operator can select one target parking space by touching a part of the display corresponding to the desired parking space. The parking available spaces may be displayed so as to be superimposed on an overhead image based on the captured images. The operation terminal 5 transmits the operation information, which is input by the operator, to the control device 10. When receiving the operation information, the control device 10 transmits an acknowledgement signal to the operation terminal 5. The operation terminal 5 receives the acknowledgement signal.

The operation terminal 5 and the control device 10 exchange the first information and the second information with each other and acquire the operation information including information for specifying the target parking space. The identification information of the selected target parking space is transmitted to the parking control apparatus 100 and input to the control device 10.

Referring again to FIG. 2, in step 107, the control device 10 and the operation terminal 5 transmit and receive the first information including the operation information. In step 108, the control device 10 and the operation terminal 5 transmit and receive the second information including the presentation information. In this example, in principle, the first information including the operation information is exchanged via the first communication path while the second information including the presentation information regarding the parking control to be presented on the operation terminal 5 is exchanged via the second communication path. As previously described, information is exchanged via the communication path which is selected in accordance with the communication quality in step 105, and the first information and the second information which are limited in accordance with the communication quality in step 106 are exchanged.

In step 109, an obstacle around the vehicle V is detected. In particular, an obstacle that exists in the vicinity of the parking route from the current position of the vehicle V to the target parking space is detected.

In step 110, the control device 10 and/or the operation terminal 5 calculate parameters used in the process of calculating the parking route and/or the control instruction, in accordance with the communication quality.

When the first evaluation value regarding the communication quality of the first communication path is less than the first threshold, the control device 10 and/or the operation terminal 5 change the parking route or the control instruction for moving along the parking route in addition to performing the process of exchanging at least part of the first information via one or more other communication paths than the first communication path. When the second evaluation value regarding the communication quality of the second communication path is less than the second threshold, the control device 10 and/or the operation terminal 5 change the parking route or the control instruction for moving along the parking route in addition to performing the process of exchanging at least part of the second information via one or more other communication paths than the second communication path.

The control device 10 sets the parameters in accordance with the communication quality. The parameters include parameters in the calculation of the parking route and parameters in the control instruction for moving the vehicle V along the parking route.

The parameters in the calculation of the parking route include a margin distance between an obstacle and the vehicle V or the parking route which is a trajectory composed of moving positions of the vehicle V. The control device 10 changes a first margin distance between the vehicle V and an obstacle detected around the vehicle V in the parking route to a second margin distance longer than the first margin distance. In general, the parking route for moving the vehicle V is set on positions at which a predetermined margin distance is maintained in order to avoid the vehicle from coming close to and/or coming into contact with surrounding obstacles. In the remote control parking process, the parking operation is easier when the vehicle V is moving with a certain distance from an obstacle than when the vehicle V is moving in close vicinity of the obstacle (the difficulty level in the former case is lower). In a state of poor communication quality, the margin distance between the vehicle V1 and an obstacle is changed to a long distance to reduce the difficulty level of the operation so that the operator can easily control the vehicle V. This allows the operator to appropriately perform the operation for the parking process even in a state of poor communication quality. In one or more embodiments of the present invention, when the communication quality becomes poor, the parking route is calculated by applying the second margin distance longer than the first margin distance applied when the communication quality is not less than an expected value. The vehicle V moving along the parking route to which the second margin distance is applied moves at a position farther from the obstacle. Through this operation, even in a state of poor communication quality, the parking process can be performed while the operator feels safe. The process of setting the parameters for the parking route and the process of calculating the parking route may be executed by the control device 10 or may also be executed by the operation terminal 5.

The parameters in the control instruction for moving the vehicle V along the parking route include any one or more of the speed, upper limit speed, acceleration, deceleration, yaw rate, lateral acceleration, steering amount, and steering speed regarding the movement of the vehicle V. By calculating the control information using parameters in accordance with the communication quality level, the vehicle V can be parked with the control content adapted to the communication quality even when the communication quality is poor. Each parameter is set for each evaluation value level of the communication quality. A first parameter is set for evaluation value level 1 (normal), and a second parameter is set for evaluation value level 2 (relatively worse than evaluation value level 1). The number of stages of the evaluation value levels is not limited to two.

The control device 10 and/or the operation terminal 5 change a first upper limit speed of the vehicle V in the control instruction to a second upper limit speed lower than the first upper limit speed. In general, when the vehicle V is moved along the parking route, an upper limit is set for the moving speed of the vehicle V. In one or more embodiments of the present invention, when the communication quality becomes poor, the control instruction is calculated by applying the second upper limit speed lower than the first upper limit speed applied when the communication quality is not less than an expected value. When the second upper limit speed is applied to the control instruction, the vehicle V is moved relatively slowly along the parking route. In the remote control parking process, the operation is easier when the vehicle V is moving at a low speed than when the vehicle V is moving at a high speed. In a state of poor communication quality, the upper limit speed is changed to a low speed to reduce the difficulty level of the operation so that the operator can easily control the vehicle V. This allows the operator to appropriately perform the operation for the parking process even in a state of poor communication quality. Moreover, the vehicle V as a target of the operation moves more slowly than usual and the operator can therefore feel safe. The process of setting the parameters in the control instruction and the process of calculating the parking route may be executed by the control device 10 or may also be executed by the operation terminal 5.

The control device 10 and/or the operation terminal 5 change a first upper limit acceleration of the vehicle V in the control instruction to a second upper limit acceleration lower than the first upper limit acceleration. In general, when the vehicle V is moved along the parking route, an upper limit is set for the acceleration in the movement of the vehicle V. The acceleration of this example includes drive parameters that affect the behavior of the vehicle V, such as acceleration/deceleration, time derivative of acceleration, and time derivative of acceleration/deceleration. In one or more embodiments of the present invention, when the communication quality becomes poor, the control instruction is calculated by applying the second upper limit acceleration lower than the first upper limit acceleration applied when the communication quality is not less than an expected value. When the second upper limit acceleration is applied to the control instruction, the vehicle V is moved along the parking route substantially at a constant speed (speed with little change). In the remote control parking process, the operation is easier when the vehicle V is moving substantially at a constant speed than when the vehicle V is moving at a speed with a large change. In a state of poor communication quality, the upper limit acceleration is changed to a low acceleration to reduce the difficulty level of the operation so that the operator can easily control the vehicle V. This allows the operator to appropriately perform the operation for the parking process even in a state of poor communication quality. Moreover, the vehicle V as a target of the operation moves substantially at a constant speed (in a state in which the speed change is small) than usual and the operator can therefore feel safe. The process of setting the parameters in the control instruction and the process of calculating the parking route may be executed by the control device 10 or may also be executed by the operation terminal 5.

Figure 10:
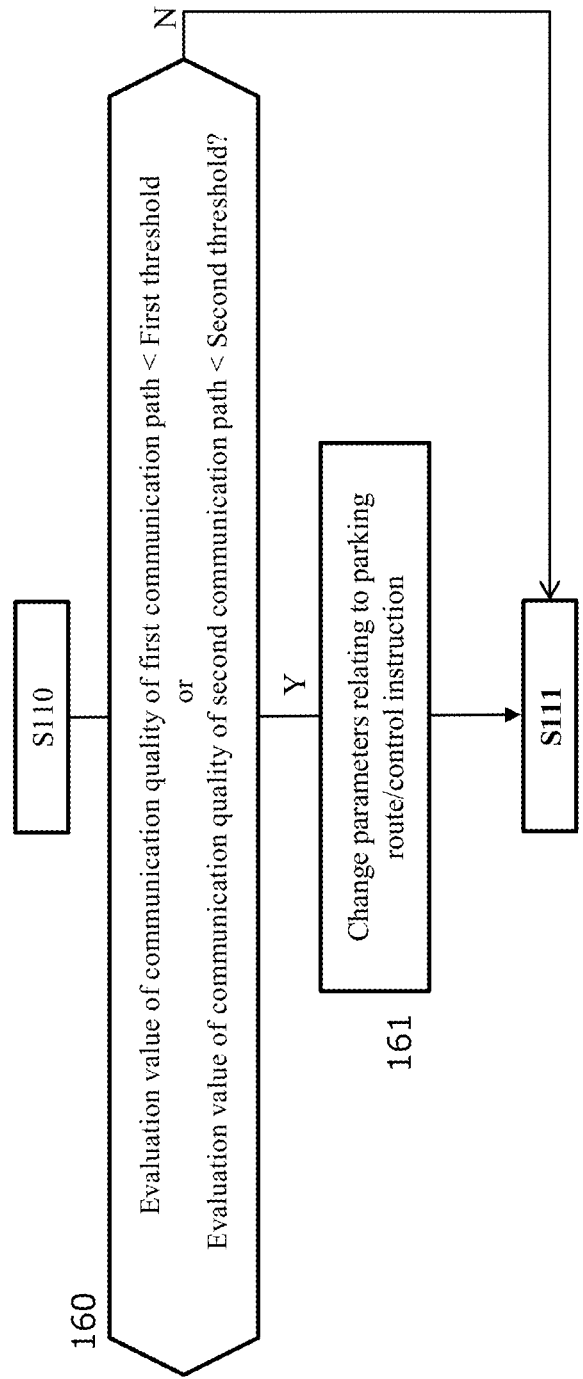
FIG. 10 is a flowchart illustrating an example of a process of changing parking route/control information.

FIG. 10 illustrates a subroutine of a process of changing the parameters relating to the parking route and/or the control instruction. In step 160 of FIG. 10, when the evaluation value of the communication quality of the first communication path is less than the first threshold or the evaluation value of the communication quality of the second communication path is less than the second threshold, the process executed by the control device 10 proceeds to step 161. In step 161, the control device 10 changes the parameters relating to the parking route and/or the control instruction. FIG. 11 lists the setting content of the parameters for the parking route and the control instruction for the vehicle V to travel along the parking route.

As listed in FIG. 11, in the process of calculating the parking route, when a determination is made that the communication quality is low, the control device 10 changes the margin distance between the obstacle and the vehicle V to a longer distance. In the process of calculating the control instruction, when a determination is made that the communication quality is low, the control device changes the upper limit speed or the upper limit acceleration of the vehicle V to a lower value. When the parameters include the yaw rate, lateral acceleration, steering amount, or steering speed of the vehicle V, it is preferred to calculate the speed, acceleration, deceleration, upper limit speed, or upper limit acceleration such that each parameter is less than a predetermined value. After setting the parameters, the process proceeds to step 111 of FIG. 2.

In the process of selecting a parking menu, two or more menus are presented in the usual case, such as entering the target parking space or exiting the parking space, but only the rescue mode is displayed as a selectable menu. The control device 10 does not accept execution instructions for other menus than the rescue mode. This allows the parking process to be executed in the remote control parking process even when the communication quality is poor.

Referring again to FIG. 2, processes after step 111 will be described.

In step 111, the control device 10 calculates a parking route using the parameters, which are set in accordance with the communication quality, and generates a control instruction for the vehicle V to travel along the calculated parking route.

When an execution instruction for the parking control process is input in step 112, the process proceeds to step 113, in which the parking control apparatus 100 according to one or more embodiments of the present invention operates to execute the parking control process.

The parking control apparatus 100 according to one or more embodiments of the present invention operates to control the operation of the drive system 40 via the vehicle controller 70 in accordance with the control information so that the vehicle V moves along the parking route.

The parking control apparatus 100 operates to calculate command signals to the drive system 40 of the vehicle V, such as an EPS motor, while feeding back the output value of the steering angle sensor 50 of the steering apparatus so that the travel trajectory of the vehicle V coincides with the calculated parking route, and transmit the command signals to the drive system 40 or to the vehicle controller 70 which controls the drive system 40.

The parking control apparatus 100 according to one or more embodiments of the present invention includes a parking control unit. The parking control unit acquires shift range information from an AT/CVT control unit, wheel speed information from an ABS control unit, steering angle information from a steering angle control unit, engine speed information from an ECM, and other necessary information. On the basis thereof, the parking control unit calculates and outputs instruction information on the autonomous steering to the EPS control unit, instruction information such as warning to a meter control unit, etc. The control device 10 acquires information items, which are acquired by the steering angle sensor 50 of the steering apparatus of the vehicle V and the vehicle speed sensor 60 and other sensors of the vehicle V, via the vehicle controller 70.

The drive system 40 according to one or more embodiments of the present invention controls the vehicle V to move (travel) from the current position to a target parking space Mo by driving based on the control instruction signals acquired from the parking control apparatus 100. The steering apparatus according to one or more embodiments of the present invention is a drive mechanism that moves the vehicle V in the right and left directions. The EPS motor included in the drive system 40 drives the power steering mechanism of the steering of the steering apparatus on the basis of the control instruction signals acquired from the parking control apparatus 100 to control the steering amount and controls the operation when moving the vehicle V to the target parking space Mo. The control content and operation scheme for parking of the vehicle V are not particularly limited, and any scheme known at the time of filing of this application can be appropriately applied.

When the parking control apparatus 100 according to one or more embodiments of the present invention operates to control the vehicle V to move along the parking route calculated based on the current position of the vehicle V and the position of the target parking space, the accelerator and the brake are controlled in an autonomous manner on the basis of the specified control vehicle speed (set vehicle speed), and the operation of the steering apparatus is also controlled in an autonomous manner in accordance with the vehicle speed. That is, during the parking control according to one or more embodiments of the present invention, the steering operation and the accelerator/brake operation are performed in an autonomous manner. The parking control apparatus 100 according to one or more embodiments of the present invention is also applicable to manual parking in which the driver performs the operation of the accelerator, brake, and steering. Additionally or alternatively, the parking control apparatus 100 according to one or more embodiments of the present invention operates to execute the remote control parking process in which the vehicle V with no driver is parked by transmitting a setting command for the target parking space, a parking process start command, a parking suspension/cancellation command, etc. to the vehicle V from the outside.

In step 114, after execution of the parking process is started, the evaluation value of the communication quality is detected at a predetermined cycle. In step 115, the control device 10 determines whether or not the evaluation value of the communication quality has changed. Additionally or alternatively, a determination may be made as to whether or not the communication quality is less than a threshold. When there is no change in the communication quality, the process proceeds to step 117.

When a determination is made that the communication quality is less than the threshold, the control device 10 recalculates parameters for calculating a parking route and a parking route using the parameters. The control device 10 recalculates parameters for calculating a control instruction and a control instruction using the parameters. This scheme is the same as the previously described content, so the content of the description is borrowed herein. In step 117, the control device 10 monitors the communication quality until the vehicle V reaches a position of turn for parking. When the vehicle V reaches the position of turn for parking, the gear shift included in the control instruction is executed in step 118. Step 118 is followed by step 119, in which the control instruction is executed to complete the parking control.

The parking control method according to one or more embodiments of the present invention is used in the parking control apparatus as the above and therefore exhibits the following effects. The parking control apparatus 100 according to one or more embodiments of the present invention is configured and operates as the above and therefore exhibits the following effects.

(1) In the parking control method according to one or more embodiments of the present invention, at least two communication paths are available. In the remote parking control process, exchange of necessary information is performed between the operation terminal 5 and the control device 10 using two or more communication paths, the first information is transmitted and received via the first communication path, and the second information is transmitted and received via the second communication path. When the evaluation value regarding the communication quality of a communication path is less than a predetermined threshold, transmission and reception are performed using one or more other communication paths, and the information amount of the first information and/or the second information is reduced.

Thus, when the communication quality of one of the communication paths is poor, the communication is performed using one or more other communication paths, and in addition to this, the information amount of the first information and/or the second information to be exchanged is reduced; therefore, even when the communication environment and the communication state are poor and the communication quality is lower than the required level, the remote parking control can be executed (carried out).

The remote parking control can be prevented from being discontinued due to poor communication quality. As a result, the reliability of the remote parking control function can be enhanced.

(2) In the parking control method according to one or more embodiments of the present invention, the control device 10 and/or the operation terminal 5 reduce the types of enterable information of the operation information thereby to reduce the information which the operator can input, so that the exchange of information can be ensured even after the communication paths are switched. The arrow buttons for fine position adjustment illustrated in FIG. 7A may be omitted. Through the above operation, the parking process can be continued even when the communication quality becomes poor.

(3) In the parking control method according to one or more embodiments of the present invention, the control device 10 and/or the operation terminal 5 may limit the enterable parking mode of the operation information to a recovery mode (rescue mode) in a direction away from the parking target position. When the recovery mode is executed, the vehicle V is moved in a direction away from the parking target position. For example, the vehicle V may be moved to the start position (position when the parking process is started). The arrow buttons for fine position adjustment may be omitted, and only a selection button for the rescue mode may be displayed. This allows the rescue mode to be immediately activated when the communication quality is poor, and the vehicle V can be moved to the original position.

(4) In the parking control method according to one or more embodiments of the present invention, by reducing the information amount of the image information, even when the quality of a communication path becomes poor, the information can be exchanged to continue the parking process.

(5) In the parking control method according to one or more embodiments of the present invention, by changing the image information into one or more diagrammatic views to reduce the information amount of the presentation information, even when the quality of a communication path becomes poor, the information can be exchanged to continue the parking process.

(6) In the parking control method according to one or more embodiments of the present invention, by reducing the number of content types included in the presentation information, even when the quality of a communication path becomes poor, the information can be exchanged to continue the parking process.

(7) In the parking control method according to one or more embodiments of the present invention, at least two communication paths are available. In the remote parking control process, exchange of necessary information is performed between the operation terminal 5 and the control device 10 using two or more communication paths, the first information is transmitted and received via the first communication path, and the second information is transmitted and received via the second communication path. When the evaluation value regarding the communication quality of a communication path is less than a predetermined threshold, transmission and reception are performed using one or more other communication paths, and the parking route and/or the control instruction for moving along the parking route are changed.

When the communication quality of one of the communication paths is poor, the communication is performed using one or more other communication paths, and in addition to this, parameters used when calculating the parking route and/or parameters used in the process of calculating the control instruction for moving the vehicle V along the parking route are changed, and the parking process is executed on the basis of a different parking route or a different control instruction; therefore, even when the communication environment and the communication state are poor and the communication quality is lower than the required level, the remote parking control can be executed with consideration for the safety.

The remote parking control can be prevented from discontinuation caused by inability to follow the parking route and control instruction (which may be unreliable) due to poor communication quality. As a result, the reliability of the remote parking control function can be enhanced.

(8) In the parking control method according to one or more embodiments of the present invention, the control device 10 changes the first margin distance between the vehicle V and an obstacle detected around the vehicle V in the parking route to the second margin distance longer than the first margin distance. In general, the parking route for moving the vehicle V is set on positions at which a predetermined margin distance is maintained in order to avoid the vehicle from coming close to and/or coming into contact with surrounding obstacles. In the remote control parking process, the operation is easier when the vehicle V is moving with a certain distance from an obstacle than when the vehicle V is moving in close vicinity of the obstacle. In a state of poor communication quality, the margin distance between the vehicle V1 and an obstacle is changed to a long distance to reduce the difficulty level of the operation so that the operator can easily control the vehicle V. This allows the operator to appropriately perform the operation for the parking process even in a state of poor communication quality. In one or more embodiments of the present invention, when the communication quality becomes poor, the parking route is calculated by applying the second margin distance longer than the first margin distance applied when the communication quality is not less than an expected value. The vehicle V moving along the parking route to which the second margin distance is applied moves at a position farther from the obstacle. Through this operation, even in a state of poor communication quality, the parking process can be performed while the operator feels safe.

(9) In the parking control method according to one or more embodiments of the present invention, when the communication quality becomes poor, the control instruction is calculated by applying the second upper limit speed lower than the first upper limit speed applied when the communication quality is not less than an expected value. When the second upper limit speed is applied to the control instruction, the vehicle V is moved relatively slowly along the parking route. In the remote control parking process, the operation is easier when the vehicle V is moving at a low speed than when the vehicle V is moving at a high speed. In a state of poor communication quality, the upper limit speed is changed to a low speed to reduce the difficulty level of the operation so that the operator can easily control the vehicle V. This allows the operator to appropriately perform the operation for the parking process even in a state of poor communication quality. Moreover, the vehicle V as a target of the operation moves more slowly than usual and the operator can therefore feel safe.

(10) In the parking control method according to one or more embodiments of the present invention, when the communication quality becomes poor, the control instruction is calculated by applying the second upper limit acceleration lower than the first upper limit acceleration applied when the communication quality is not less than an expected value. When the second upper limit acceleration is applied to the control instruction, the vehicle V is moved along the parking route substantially at a constant speed (speed with little change). In the remote control parking process, the operation is easier when the vehicle V is moving substantially at a constant speed than when the vehicle V is moving at a speed with a large change. In a state of poor communication quality, the upper limit acceleration applied to the control instruction is changed to a low acceleration to reduce the difficulty level of the operation so that the operator can easily control the vehicle V. This allows the operator to appropriately perform the operation for the parking process even in a state of poor communication quality. Moreover, the vehicle V as a target of the operation moves substantially at a constant speed (in a state in which the speed change is small) than usual and the operator can therefore feel safe.

(11) In the parking control method according to one or more embodiments of the present invention, one or more other communication paths used when the communication quality is low in the first communication path and/or in the second communication path may be not only the first communication path and/or the second communication path, which are set as default paths, but also the third communication path other than the first communication path and the second communication path. Thus, the one or more other communication paths are used when the communication quality of a communication path is low, and the parking process can therefore be continued even if the communication quality becomes poor.

(12) The above-described parking control method can be carried out using the parking control apparatus 100 according to one or more embodiments of the present invention. Therefore the parking control apparatus 100 according to one or more embodiments of the present invention exhibits the above-described actions and effects.

(13) The above-described parking control method can be carried out using the parking control apparatus 100 according to one or more embodiments of the present invention. Therefore the parking control apparatus 100 according to one or more embodiments of the present invention exhibits the above-described actions and effects.

Part or all of each process of the parking control process according to one or more embodiments of the present invention may be executed in the parking control apparatus 100, or the parking control apparatus 100 may transmit the parking control instruction to the operation terminal 5 so that the operation terminal 5 side executes it. Part or all of each process of the parking control process according to one or more embodiments of the present invention may be executed in the operation terminal 5, or the operation terminal 5 may transmit the parking control instruction to the parking control apparatus 100 so that the parking control apparatus 100 side executes it.

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

1000 Parking control system
100 Parking control apparatus
10 Control device
11 CPU
12 ROM
13 RAM
20 Input device
21 Communication device
30 Output device
31 Display
1, 1a-1d Cameras
2 Ranging devices
3 Information server
5 Operation terminal
200 Onboard apparatus
40 Drive system
50 Steering angle sensor
60 Vehicle speed sensor
70 Vehicle controller
V Vehicle, Vehicle as object of parking control

The invention claimed is:

1. A parking control method for parking a vehicle in accordance with a control instruction for moving along a parking route, the control instruction being based on operation information input to an operation terminal located outside the vehicle, the parking control method comprising:
exchanging first information via a first communication path, the first information including the operation information;
exchanging second information via a second communication path, the second information including presentation information regarding parking control, the presentation information being presented on the operation terminal; and
when a first evaluation value regarding communication quality of the first communication path is less than a first threshold, exchanging at least part of the first information via one or more other communication paths than the first communication path, while when a second evaluation value regarding communication quality of the second communication path is less than a second threshold, exchanging at least part of the second information via one or more other communication paths than the second communication path and reducing an information amount of the first information and/or the second information.

2. The parking control method according to claim 1, comprising,
when the first evaluation value regarding communication quality of the first communication path is less than the first threshold, reducing types of enterable information of the operation information.

3. The parking control method according to claim 2, comprising,
when the first evaluation value regarding communication quality of the first communication path is less than the first threshold, limiting an enterable parking mode of the operation information to a recovery mode in a direction away from a parking target position.

4. The parking control method according to claim 1, comprising,
when the second evaluation value regarding communication quality of the second communication path is less than the second threshold, reducing the information amount of the presentation information.

5. The parking control method according to claim 4, comprising,
when the second evaluation value regarding communication quality of the second communication path is less than the second threshold, changing image information included in the presentation information into a diagrammatic view.

6. The parking control method according to claim 4, comprising,
when the second evaluation value regarding communication quality of the second communication path is less than the second threshold, reducing the number of content types included in the presentation information.

7. A parking control method for parking a vehicle in accordance with a control instruction for moving along a parking route, the control instruction being based on operation information input to an operation terminal located outside the vehicle, the parking control method comprising:
exchanging first information via a first communication path, the first information including the operation information;
exchanging second information via a second communication path, the second information including presentation information regarding parking control, the presentation information being presented on the operation terminal; and
when a first evaluation value regarding communication quality of the first communication path is less than a first threshold, exchanging at least part of the first information via one or more other communication paths than the first communication path, while when a second evaluation value regarding communication quality of the second communication path is less than a second threshold, exchanging at least part of the second information via one or more other communication paths than the second communication path and changing the parking route or the control instruction for moving along the parking route.

8. The parking control method according to claim 7, wherein a process of calculating the parking route includes changing a first margin distance between the vehicle and an obstacle detected around the vehicle in the parking route to a second margin distance longer than the first margin distance.

9. The parking control method according to claim 7, wherein a process of changing the control instruction includes changing a first upper limit speed of the vehicle in the control instruction to a second upper limit speed lower than the first upper limit speed.

10. The parking control method according to claim 7, wherein a process of changing the control instruction includes changing a first upper limit acceleration of the vehicle in the control instruction to a second upper limit acceleration lower than the first upper limit acceleration.

11. The parking control method according to claim 1, wherein the one or more other communication paths include the first communication path, the second communication path, and a third communication path other than the first communication path and the second communication path.

12. A parking control apparatus comprising a control device configured to execute a control instruction for moving along a parking route, the control instruction being based on operation information input to an operation terminal located outside the vehicle, the control device being further configured to:
exchange first information via a first communication path, the first information including the operation information;
exchange second information via a second communication path, the second information including presentation information regarding parking control, the presentation information being presented on the operation terminal; and
when a first evaluation value regarding communication quality of the first communication path is less than a first threshold, exchange at least part of the first information via one or more other communication paths than the first communication path, while when a second evaluation value regarding communication quality of the second communication path is less than a second threshold, exchange at least part of the second information via one or more other communication paths than the second communication path and reduce an information amount of the first information and/or the second information.

13. A parking control apparatus comprising a control device configured to execute a control instruction for moving along a parking route, the control instruction being based on operation information input to an operation terminal located outside the vehicle, the control device being further configured to:

exchange first information via a first communication path, the first information including the operation information;

exchange second information via a second communication path, the second information including presentation information regarding parking control, the presentation information being presented on the operation terminal; and when a first evaluation value regarding communication quality of the first communication path is less than a first threshold, exchange at least part of the first information via one or more other communication paths than the first communication path, while when a second evaluation value regarding communication quality of the second communication path is less than a second threshold, exchange at least part of the second information via one or more other communication paths than the second communication path and change the parking route or the control instruction for moving along the parking route.

14. The parking control method according to claim 7, wherein the one or more other communication paths include the first communication path, the second communication path, and a third communication path other than the first communication path and the second communication path.

* * * * *